United States Patent
Cavallari et al.

(10) Patent No.: US 11,610,582 B2
(45) Date of Patent: Mar. 21, 2023

(54) SYSTEMS AND METHODS FOR FORMATTING INFORMAL UTTERANCES

(71) Applicant: PAYPAL, INC., San Jose, CA (US)

(72) Inventors: Sandro Cavallari, Tanjong Pagar (SG); Yuzhen Zhuo, Tiong Bahru (SG); Van Hoang Nguyen, Clementi New Town (SG); Quan Jin Ferdinand Tang, Tanglin (SG); Gautam Vasappanavara, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 231 days.

(21) Appl. No.: 16/831,058

(22) Filed: Mar. 26, 2020

(65) Prior Publication Data
US 2021/0304741 A1    Sep. 30, 2021

(51) Int. Cl.
*G06F 40/00* (2020.01)
*G10L 15/19* (2013.01)
(Continued)

(52) U.S. Cl.
CPC ............ *G10L 15/19* (2013.01); *G06F 40/253* (2020.01); *G06F 40/284* (2020.01); *G10L 15/26* (2013.01)

(58) Field of Classification Search
CPC ....... G10L 15/19; G10L 15/26; G06F 40/253; G06F 40/28; G06F 40/242; G06F 40/35
See application file for complete search history.

(56) References Cited

U.S. PATENT DOCUMENTS

2012/0072204 A1* 3/2012 Nasri ................ G06F 40/253
704/260
2014/0365222 A1* 12/2014 Weider ............... G10L 15/22
704/257
(Continued)

FOREIGN PATENT DOCUMENTS

| GB | 2327133 A * | 1/1999 | ........... G06F 40/284 |
| WO | WO-9924955 A1 * | 5/1999 | ......... G06F 21/6209 |
| WO | WO-2019052811 A1 * | 3/2019 | ............. G16H 10/60 |

OTHER PUBLICATIONS

Cook, Paul, and Suzanne Stevenson, "An Unsupervised Model for Text Message Normalization," Jun. 2009, Proceedings of the NAACL HLT Workshop on Computational Approaches to Linguistic Creativity, 71-78 (Year: 2009).*
(Continued)

*Primary Examiner* — Andrew C Flanders
*Assistant Examiner* — Parker Mayfield
(74) *Attorney, Agent, or Firm* — Haynes and Boone, LLP (57) ABSTRACT

Methods and systems are presented for translating informal utterances into formal texts. Informal utterances may include words in abbreviation forms or typographical errors. The informal utterances may be processed by mapping each word in an utterance into a well-defined token. The mapping from the words to the tokens may be based on a context associated with the utterance derived by analyzing the utterance in a character-by-character basis. The token that is mapped for each word can be one of a vocabulary token that corresponds to a formal word in a pre-defined word corpus, an unknown token that corresponds to an unknown word, or a masked token. Formal text may then be generated based on the mapped tokens. Through the processing of informal utterances using the techniques disclosed herein, the informal utterances are both normalized and sanitized.

20 Claims, 7 Drawing Sheets

(51) Int. Cl.
*G06F 40/253* (2020.01)
*G06F 40/284* (2020.01)
*G10L 15/26* (2006.01)

(56) References Cited

U.S. PATENT DOCUMENTS

2016/0335244 A1* 11/2016 Weisman ............... G06F 40/284
2019/0251165 A1* 8/2019 Bachrach ................ G06F 40/30

OTHER PUBLICATIONS

Han, Bo, and Timothy Baldwin, "Lexical Normalisation of Short Text Messages: Makn Sens a# twitter," Jun. 19-24, 2011, Proceedings of the 49th Annual Meeting of the Association for Computational Linguistics: Human Language Technologies, 368-378 (Year: 2011).*

Bahdanau, Dzmitry et al., "Neural machine translation by jointly learning to align and translate", arXiv preprint arXiv:1409.0473, 2014.

Brill, Eric et al., "An improved error model for noisy channel spelling correction", Proceedings of the 38th Annual Meeting on Association for Computational Linguistics, pp. 286-293. Association for Computational Linguistics, 2000.

Cho, Kyunghyun et al., "Learning phrase representations using rnn encoder-decoder for statistical machine translation", In Conference on Empirical Methods in Natural Language Processing (EMNLP 2014), 2014.

Church, Kenneth W. et al., "Probability scoring for spelling correction", Statistics and Computing, 1(2):93-103, 1991.

Dai, Zihang et al., "Transformer-xl: Attentive language models beyond a fixed-length context", Conference: Proceedings of the 57th Annual Meeting of the Association for Computational Linguistics, 2019.

Devlin, Jacob, et al., "Bert: Pre-training of deep bidirectional transformers for language understanding", North American Chapter of the Association for Computational Linguistics, 2019.

Dong, Li, et al., "Unified language model pre-training for natural language understanding and generation", $33^{rd}$ Conference on Neural Information Processing Systems—NeurIPS 2019, 2019.

Edizel, Bora et al., "Misspelling oblivious word embeddings", arXiv preprint arXiv:1905.09755, 2019.

Goldberg, Yoav et al., "word2vec explained: deriving mikolov et al.'s negative-sampling word-embedding method", arXiv preprint arXiv:1402.3722, 2014.

Graves, Alex et al., "Neural turing machines", arXiv:1410.5401, 2014.

Gu, Jiatao et al., "Levenshtein transformer", $33^{rd}$ Conference on Neural Informaton Processing System (NeurIPS 2019), Vancouver, Canada.

Gulcehre, Cagler et al., "Pointing the unknown words", In 54th Annual Meeting of the Association for Computational Linguistics, ACL 2016—Long Papers (pp. 140-149). (54th Annual Meeting of the Association for Computational Linguistics, ACL 2016—Long Papers; vol. 1). Association for Computational Linguistics (ACL).

Gulcehre, Cagler et al., "Memory augmented neural networks with wormhole connections", arXiv preprint arXiv:1701.08718, 2017.

Guyon, Isabelle et al., "Discovering informative patterns and data cleaning", Advances in Knowledge Discovery and Data Mining, pp. 181-203, 1996.

Han, Bo et al., "Lexical normalisation of short text messages: Makn sens a# twitter", In Proceedings of the 49th Annual Meeting of the Association for Computational Linguistics: Human Language Technologies—vol. 1, pp. 368-378, Association for Computational Linguistics, 2011.

Hinton, Geoffrey E., "Learning distributed representations of concepts", Proceedings of the eighth annual conference of the cognitive science society, vol. 1, pp. 12. Amherst, MA, 1986.

Hutto, Clayton J., et al., "Vader: A parsimonious rule-based model for sentiment analysis of social media text", Eighth international AAAI conference on weblogs and social media, 2014.

Luong, Thang et al., "Effective approaches to attention-based neural machine translation", Proceedings of the 2015 Conference on Empirical Methods in Natural Language Processing, pp. 1412-1421, 2015.

Merity, Stephen et al., "Pointer sentinel mixture models", arXiv preprint arXiv:1609.07843, 2016.

Mikolov, et al., "Distributed representations of words and phrases and their compositionality", Advances in neural information processing systems, pp. 3111-3119, 2013.

Min, Wookhee et al., "Ncsu sas wookhee: a deep contextual long-short term memory model for text normalization", Proceedings of the Workshop on Noisy User-generated Text, pp. 111-119, 2015.

Rahm, Erhard et al., "Data cleaning: Problems and current approaches", IEEE Data Eng. Bull., 23(4):3-13, 2000.

Sanchez, David, "Detecting sensitive information from textual documents: an information-theoretic approach", International Conference on Modeling Decisions for Artificial Intelligence, pp. 173-184. Springer, 2012.

See, Abigail et al., "Get to the point: Summarization with pointer generator networks", Proceedings of the 55th Annual Meeting of the Association for Computational Linguistics (vol. 1: Long Papers), pp. 1073-1083, 2017.

Sproat, Richard et al., "Rnn approaches to text normalization: A challenge" arXiv preprint arXiv:1611.00068, 2016.

Sukhbaatar, Sainbayar et al., "End-to-end memory networks", Advances in neural information processing systems, pp. 2440-2448, 2015.

Sutskever, Ilya et al. "Sequence to sequence learning with neural networks" Advances in neural information processing systems, pp. 3104-3112, 2014.

Sweeney, Latanya, "Replacing personally-identifying information in medical records, the scrub system", Proceedings of the AMIA annual fall symposium, pp. 333. American Medical Informatics Association, 1996.

Vaswani, Ashish et al., "Attention is all you need", Advances in neural information processing systems, pp. 5998-6008, 2017.

Vinyals, Oriol et al., "Pointer networks", Advances in Neural Information Processing Systems, pp. 2692-2700, 2015.

Weston, Jason et al., "Memory networks", arXiv preprint arXiv:1410.3916, 2014.

Yang, Zhilin et al., "XLNet: Generalized Autoregressive Pretraining for Language Understanding", $33^{rd}$ Conference on Neural Information Processing System (NeurIPS) Canada, 2019.

Zhang, Hao et al., "Neural models of text normalization for speech applications", Computational Linguistics, vol. 45, No. 2, pp. 293-337, 2019.

Sennrich, Rico et al., "Neural machine translation of rare words with subword units", arXiv preprint arXiv:1508.07909, 2015.

* cited by examiner

SYSTEMS AND METHODS FOR FORMATTING INFORMAL UTTERANCES

TECHNICAL FIELD

The present specification generally relates to automated data processing, and more specifically, to formatting and sanitizing informal utterances made through automated data processing systems according to various embodiments of the disclosure.

BACKGROUND

Service providers have increasingly relied on automated mechanisms to provide services to customers. Interactive voice response (IVR) systems and chatbots are examples of such mechanisms. In the past, these automated services are limited as they require formal and pre-defined inputs from the users. Inputs provided by users must follow pre-defined rules (e.g., a selection from a limited set of options, etc.) in order for the users to obtain assistances from the automated service. Any input from the users that do not follow the pre-defined rules would be ignored by the automated service. While such automated services limit the users' form of expressions, they are able to provide consistent services as the rules and formality requirements remove any ambiguity from the users' inputs.

With the advent of natural language processing, these automated mechanisms have since evolved to allow users to provide inputs in natural language (e.g., a sentence instead of a selection, etc.). However, the flexibility in input for the users also causes an increased likelihood of confusion and misunderstanding. Natural language processors are trained to parse and analyze relatively longer text in formal languages, such as an article, a book, etc. However, short utterances that are usually used for communication in phone calls and online chat sessions include an informal language structure (e.g., does not conform to formal grammatical rules), words in short-forms (e.g., abbreviations, etc.) and typographical errors, which imposes challenges to the natural language processors' ability to decipher the utterances. Thus, there is a need for developing a tool to pre-process informal utterances such that these automated services can properly analyze the inputs of the users in informal settings.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for processing informal utterances by mapping each word in an utterance into a well-defined token. Utterances can be phrases that a user transmits to an automated service via a text messaging application or an online chat client. Utterances can also be phrases that are generated using a voice recognition module based on audio input provided by a user during a phone conversation. The mapping from the words to the tokens may be based on a context associated with the utterance derived by analyzing the utterance on a character-by-character basis. The token that is mapped for each word can be one of a vocabulary token that corresponds to a formal word in a pre-defined word corpus, an unknown token that corresponds to an unknown word, or a masked token used for redacting sensitive data. Formal text may then be generated based on the mapped tokens. Through the processing of informal utterances using the techniques disclosed herein, the informal utterances are both normalized (e.g., translated into well-defined texts) and sanitized (e.g., removed of sensitive data). As defined herein, sensitive data may include private data of individuals such as credit card numbers, health information, personal identity numbers, and other data that the individual does not wish or intend to be accessed or stored by unauthorized entities.

As discussed above, analyzing informal utterances that include an informal language structure such as abbreviations and typographical errors can be challenging. When an automated service (e.g., an IVR system, a chatbot, etc.) cannot understand what the user wants (e.g., cannot determine an intent of the user), the automated service would not be able to facilitate a meaningful dialogue with the user and provide relevant services to the user. Furthermore, while natural language processors may be capable of analyzing text to derive meaning from the text, they perform poorly in categorizing data, especially non-text data such as credit card numbers, social security numbers, etc. Conventionally, automated systems have adopted a rule-based approach (e.g., using regular expressions, etc.) to categorize data (e.g., determine if the data includes sensitive information such as credit card numbers, social security numbers, etc.) so that they can perform additional pre-processing of the data (e.g., masking of sensitive data, etc.) before storing and/or further analyzing the data. However, similar to the deficiencies of the natural language processors, the rule-based approach works well only when the data conforms to a set of pre-defined rules (e.g., a monetary amount begins with a '$' sign, a credit card number is either a 16 digit number that starts with a '4' or a 15 digit number that starts with a '3', etc.). Unfortunately, informal utterances such as those in a casual phone conversation and online chat sessions oftentimes do not follow these rules.

For example, while a rule-based data categorizer may successfully detect a credit card number in the utterance "I need to delete my credit card 5496-9579-4394-2954" since the credit card number included in the utterance follows the regular format of a credit card number (####-####-####-####), where each '#' represents a number, a rule-based data categorizer may not be able to recognize that a partial credit card number is included in the following utterance "the refund will post to your credit card ending in (8077) in the next 3-5 business days." Furthermore, a rule-based data categorizer may also mis-categorize data when different data types share the same or similar formats. For example, a rule-based data categorizer may mistakenly categorize the tracking number in this utterance "I sent the faulty provided tracking 4536543234980912 USPS" as a credit card number due to its format being similar to one associated with a credit card number.

Thus, according to some embodiments of the disclosure, a chat formatting system may process (e.g., format, normalize, and sanitize) an informal utterance by translating informal words (e.g., abbreviations, words with typographical errors, short-forms, etc.) to formal texts that are part of a pre-defined corpus, and identifying and processing (e.g., redacting, masking, etc.) sensitive data within the utterance. The chat formatting system may include a corpus of words that may be used for formatting the utterances. The corpus of words may include words from a dictionary. However, since any automated service is configured to have a limited range of dialogues and provide a limited range of services within a particular domain (e.g., electronic payment, online shopping for a set of products, etc.), the chat formatting system may generate a corpus that includes only words that are relevant to the particular domain. Having a small corpus of formal words is beneficial as the translation generated by the chat formatting system is more precise and consistent.

In some embodiments, the chat formatting system may obtain past chat utterances generated over a period of time (e.g., last year, last 5 years), and select words for the corpus based on the past chat utterances. In one example, the chat formatting system may select words that appear in the past chat utterances above a frequency threshold. In some embodiments, the chat formatting system may also provide a user interface that enables a user (e.g., an administrator of the automated service) to modify the corpus. By generating the corpus using past chat utterances, the size (the number of words) of the corpus can be significantly smaller than a corpus that includes all possible words (e.g., from a dictionary). A benefit of having a small corpus is that the chat formatting system can ensure that words from the informal utterance can be mapped to words that are relevant to the domain, which may reduce the chance of mis-translation. In some embodiments, the chat formatting system may exclude any words that have no meaning (e.g., names, etc.).

Once the corpus is defined, the chat formatting system may generate tokens. In some embodiments, the chat formatting system may generate a token for each word in the corpus. The chat formatting system may also generate an unknown token for words that cannot be mapped to any word in the corpus. The chat formatting system may also generate a masked token representing sensitive data. The chat formatting system may then store the generated tokens in a token database.

In some embodiments, the chat formatting system may also generate a context model that is configured to determine (e.g., predict) a context of an utterance based on character information associated with the utterance. Each utterance may be associated with a context, which may correspond to an overall theme of the utterance. The context may be defined by a summation of words and/or characters included within the utterance (and within one or more related past utterances). The context that is associated with the utterance may influence how each word within the utterance is translated. The context is especially important for translating informal utterances as words that are abbreviations or having errors can be translated to possibly multiple formal words (or meanings) depending on the context of the utterance.

Individual words of the utterance may be analyzed to determine a context for the chat message. However, due to the unique characteristics of informal utterances, which may include abbreviations, typographical errors, and other informal language structure, analyzing the utterance on a word-by-word basis may render an inaccurate result. Instead, according to various embodiments of the disclosure, the chat formatting system may determine a context for the chat message based on individual characters that appear in the utterance.

The chat formatting system may divide the utterance into its character components and provide the character components to a context model that is configured to derive context information based on the character components of the utterance. In some embodiments, the chat formatting system may also generate character data, such as frequencies of each character (e.g., each letter, numerals, symbols, etc.) appearing in the utterance, positions of each character, surrounding characters for each position, a length of the utterance, etc., and may provide the character data to the context model.

In some embodiments, the chat formatting system may generate a context space having two or more dimensions representing the different contexts that can be associated with different utterances. The chat formatting system may obtain historic utterances (utterances that have been received by the automated service in the past) that are labeled with context information (e.g., a point within the context space). The context information associated with the historic utterances may be generated by the context model based on character information of the utterances or may be provided by an administrator who manually reviewed and labeled the utterances. In some embodiments, the context information may be generated using a clustering algorithm (e.g., k-means). For example, the chat formatting system may determine two or more clusters of utterances based on their positions within the context space. Each of the clusters may correspond to a different context. When the context information associated with the historic utterances are labeled by the administrator, the chat formatting system may train the context model (which may be a machine learning model) based on the historic utterances and their labeled context information.

Once the context model is trained, the chat formatting system may begin using the context model to derive (e.g., predict) context information from an utterance. For example, when the automated service receives an utterance from a user (e.g., via a phone conversation, an online chat session, etc.), the automated service of some embodiments may send a request to the chat formatting system for processing the utterance before the automated service analyzes the utterance and performs services based on the utterance. The utterance that has been processed by the chat formatting system may be formalized and sanitized, which may enable the automated service to improve data security and performance in providing relevant services to the user. Upon receiving the request, the chat formatting system may first analyze the utterance on a character-by-character basis to derive character information (e.g., frequencies, positions, surrounding characters, etc.). The chat formatting system may then provide the character information to the context model to derive context information (e.g., a point or a vector in the context space) associated with the utterance. The derived context may then be used to assist the chat formatting system to map each word in the utterance to a token in the token database.

As discussed herein, the chat formatting system includes a token database that stores all of the tokens available to the chat formatting system. The tokens stored in the token database may include vocabulary tokens that correspond to words (e.g., vocabularies) in a pre-defined corpus, an unknown token, and a mask token. To map each word in the utterance to a token, the chat formatting system may first identify the different words appearing in the utterance. In some embodiments, as the chat formatting system parses the utterance (e.g., when the chat formatting system analyzes the characters in the utterance), the chat formatting system may generate pointers that point to the start and/or the end of each word in the utterance. Each word becomes a separate entity to be mapped to a respective token. The chat formatting system may identify the different words in the utterance based on pre-defined delimiters (e.g., spaces, punctuations, etc.).

The chat formatting system may extract each word from the utterance based on the pointers. For each word in the utterance, the chat formatting system may map the word to a corresponding token (e.g., a vocabulary token, an unknown token, a masked token, etc.) in the token database. The chat formatting system may use a mapping model to determine probabilities that the word is associated with the different tokens in the token database (e.g., a probability distribution of the word over the tokens in the token database). The probabilities may be determined based on a similarity between the word and the formal texts (e.g., the vocabularies) in the corpus and the portion of the utterance that has been normalized (e.g., has been translated into the output text). In some embodiments, the chat formatting system may modify the probabilities based on the context information (e.g., the point, the vector, etc.) derived from the character information associated with the utterance. In some embodiments, instead of modifying the probability, the derived context is provided to the mapping model (which may be a machine learning model) as one of the inputs (along with the word) for mapping to a corresponding token. The output of the machine learning model may be one of the tokens from the token database or a probability distribution of the word over the tokens in the token database. The chat formatting system may then select a token having the highest probability.

The mapping model, which may be a machine learning model, may be trained using different informal words that have been labeled (mapped to one of the pre-defined tokens). In some embodiments, each of the training data may include an informal word, its associated context information (e.g., a point, a vector within the context space), and the mapped token. Thus, based on the informal word extracted from the utterance and the context information derived from the utterance, the mapping model may be used to output mapped token data. As discussed herein, the output of the mapping model may be one of the tokens from the token database or a probability distribution over the tokens in the token database.

After mapping each word in the utterance to a token, the chat formatting system may generate an output text based on the token. For each word that is mapped to a vocabulary token (corresponding to a formal text in the corpus), the chat formatting system may translate the word into the corresponding formal text (e.g., the corresponding vocabulary) in the corpus. For a word that is mapped to an unknown token (e.g. the word may correspond to a name of an entity or a non-word, such as a series of digits and/or alphabets, that does not include sensitive data), the chat formatting system may retrieve the original word from the utterance and may use the original word as the translated word. For a word that is mapped to a masked token, the chat formatting system may generate a masked text as the translated word. The masked text may simply be one or more symbols representing a masked text (e.g., "<MASKED>", "<REDACTED>", "**", etc.), which hide all of the information associated with the original text, even a length of the original text. In some embodiments however, the chat formatting system may generate the masked text to have the same length (e.g., the same number of characters) as the original word, such that the length information of the original text can be provided (which may assist the reader in determining the type of information that has been masked) without revealing the original text. For example, when the original word includes a 16 digit credit card number, the masked text may be generated as "   **". The chat formatting system may combine the translated words together to generate the output text. The output text generated by the chat formatting system is both normalized (e.g., include well-defined formal text) and sanitized (e.g., removed of sensitive data). Thus, the chat formatting system may then provide the output to the automated service or other utterance analysis module for further processing with higher accuracy and data security. The automated service may provide services and/or a dialogue to the user based on the output.

Figure 1:
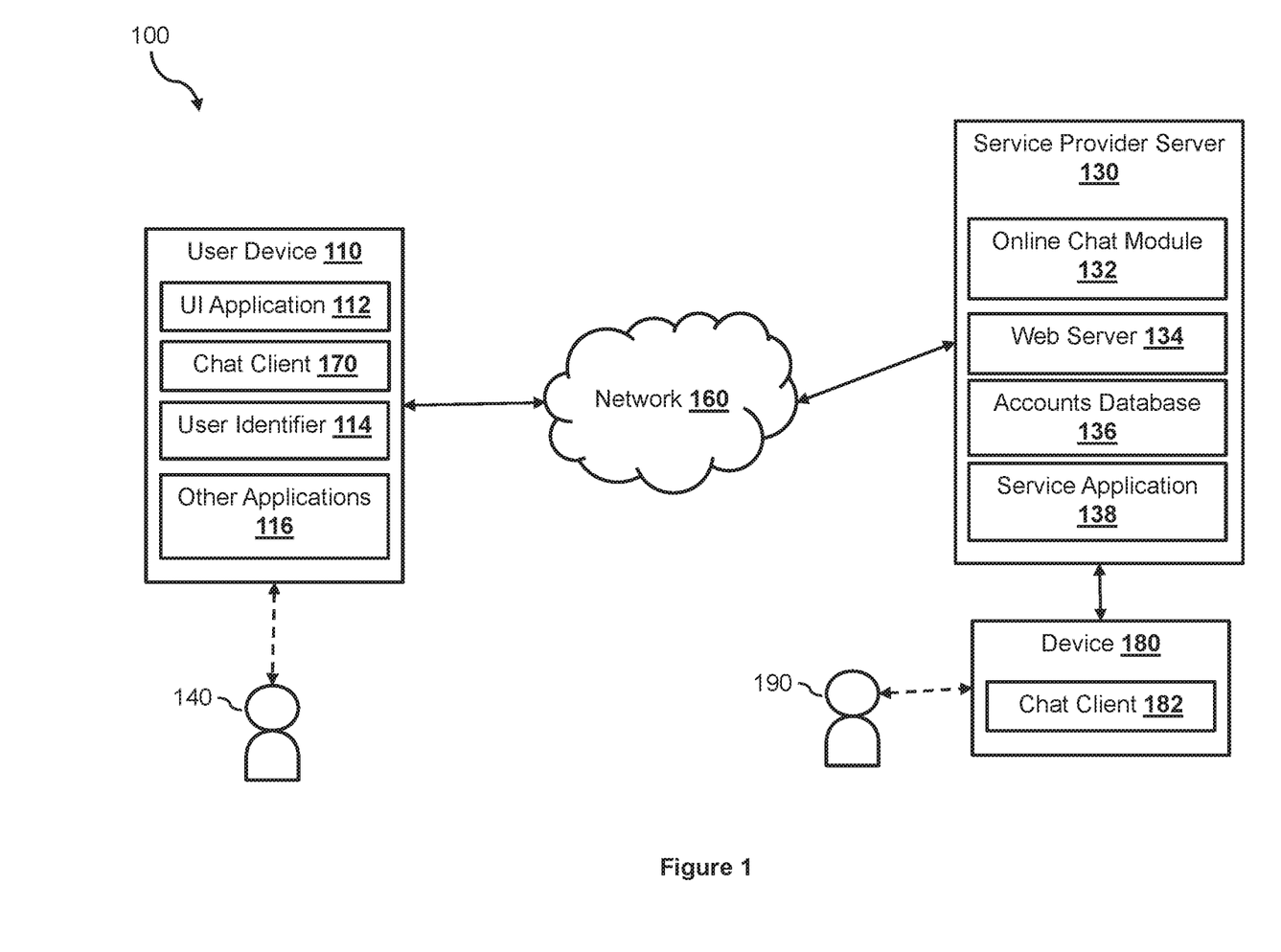
FIG. 1 is a block diagram illustrating an electronic transaction system according to an embodiment of the present disclosure.

FIG. 1 illustrates an electronic transaction system 100 within which the chat formatting system may be implemented according to one embodiment of the disclosure. The electronic transaction system 100 includes a service provider server 130 associated with a service provider and a user device 110 that may be communicatively coupled with each other via a network 160. The service provider server 130 may be communicatively coupled with a device 180 directly or via an internal network associated with the service provider. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 and/or other user devices similar to the user device 110 over the network 160. For example, the user 140 may use the user device 110 to log in to a user account with the service provider to access account services or conduct electronic transactions (e.g., account transfers or payments, purchase goods and/or services, sales of goods and/or services, receive payments of the sale, etc.) with the service provider server 130. Furthermore, the user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., electronic payment transactions, logging in to a user account, viewing transactions, etc.) with the service provider server 130 over the network 160. In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110 may also include a chat client 170 for facilitating online chat sessions with another chat client (e.g., the chat client 182 of the device 180, a chat robot, etc.). The chat client 170 may be a software application executed on the user device 110 for providing a chat client interface for the user 140 and for exchanging (e.g., transmitting and receiving) messages with the other chat client. For example, during an online chat session with the chat client 182, the chat client 170 may present a chat interface that enables the user 140 to input data (e.g., text data such as utterances, audio data, multi-media data, etc.) for transmitting to the chat client 182 or the chat robot. The chat interface may also present messages that are received from the chat client 182, and messages that have been transmitted to the chat client 182. In some embodiments, the messages may be presented on the chat client interface in a chronological order according to a chat flow of the online chat session. The chat client 170 may be an embedded application that is embedded within another application, such as the UI application 112. Alternatively, the chat client 170 may be a stand-alone chat client program (e.g., a mobile app such as WhatsApp®, Facebook® Messenger, iMessages®, etc.) that is detached from any other software applications executed on the user device 110.

The user device 110, in various embodiments, may include other applications 116 as may be desired in one or more embodiments of the present disclosure to provide additional features available to the user 140. For example, the applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be embedded within messages transmitted to other chat clients (e.g., the chat client 182 or the chat robot) via an online chat session, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

Even though only one user device 110 is shown in FIG. 1, it has been contemplated that one or more user devices (each similar to user device 110) may be communicatively coupled with the service provider server 130 via the network 160 within the system 100.

The service provider server 130, in one embodiment, may be maintained by an online service provider, which may provide services (e.g., selling of merchandise processing, performing electronic transactions, performing electronic payment transactions, etc.). As such, the service provider server 130 may include a service application 138, which may be adapted to interact with the user devices (such as the user device 110) over the network 160 to facilitate the electronic transaction services, and/or other services offered by the service provider server 130. In one example, the service provider server 130 may be provided by PayPal, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page and is configured to serve the log-in page to users for logging into user accounts of the users to access various service provided by the service provider server 130. The web server 134 may also include other webpages associated with the different services offered by the service provider server 130. As a result, a user (e.g., the user 140) may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include an online chat module 132 that implements the functionality of the chat formatting system as disclosed herein. In some embodiments, the online chat module 132 comprises a chat server for facilitating and managing online chat sessions between chat clients (e.g., the chat clients 170 and 182, the chat robot of the online chat module 132, etc.). For example, when the online chat module 132 receives one or more messages transmitted from one of the chat clients 170 and 182, the online chat module 132 may process the messages and then transmit one or more corresponding messages to the other one of the chat clients 170 and 182 to be displayed on the corresponding chat interface. The online chat module 132 of some embodiments may also manage the chat flows of the online chat sessions. For example, as the online chat module 132 receives the one or more messages from the chat clients 170 and 182 during an online chat session, the online chat module 132 may record the messages in the chat flow associated with the online chat session. The online chat module 132 may also store the chat flow in a persistent storage such that the chat flow may be accessed subsequently even after the online chat session is terminated. As disclosed herein, the online chat module 132 may also include a chat robot for providing automated services (e.g., automated assistance) with the user 140 via an online chat session. Once an online chat session is established between the user device 110 and the chat robot of the online chat module 132, the online chat module may monitor the messages (e.g., utterances) transmitted during the online chat session. The online chat module 132 may also predict an intent of the user (e.g., the user 140) based on one or more utterances monitored during the online chat session. Based on the predicted intent, the chat robot may provide a dialogue with the user 140 via the online chat session and may cause relevant services (e.g., processing a refund, initiating a dispute, processing a payment, etc.) to be provided for the user 140 by using one or more other applications, such as the service application 138.

As discussed above, a device 180 may be communicatively coupled with the service provider server 130. The device 180 may be operated by an entity 190 such as a person (e.g., an employee of the service provider such as a customer service representative). The device 180 may include a chat client 182 that is similar to the chat client 170, which enables the entity 190 to generate and transmit messages to another chat client (e.g., the chat client 170) and view messages generated by the chat client 170, as part of an online chat session. In some embodiments, when it is determined that the online chat module 132 is unable to provide automated chat assistance to the user 140 (e.g., the online chat module 132 is unable to predict an intent of the user 140 based on the one or more utterances), the online chat module 132 may connect the device 180 to the online chat session such that the entity 190 may conduct a chat with the user 140 via the online chat session.

Figure 2:
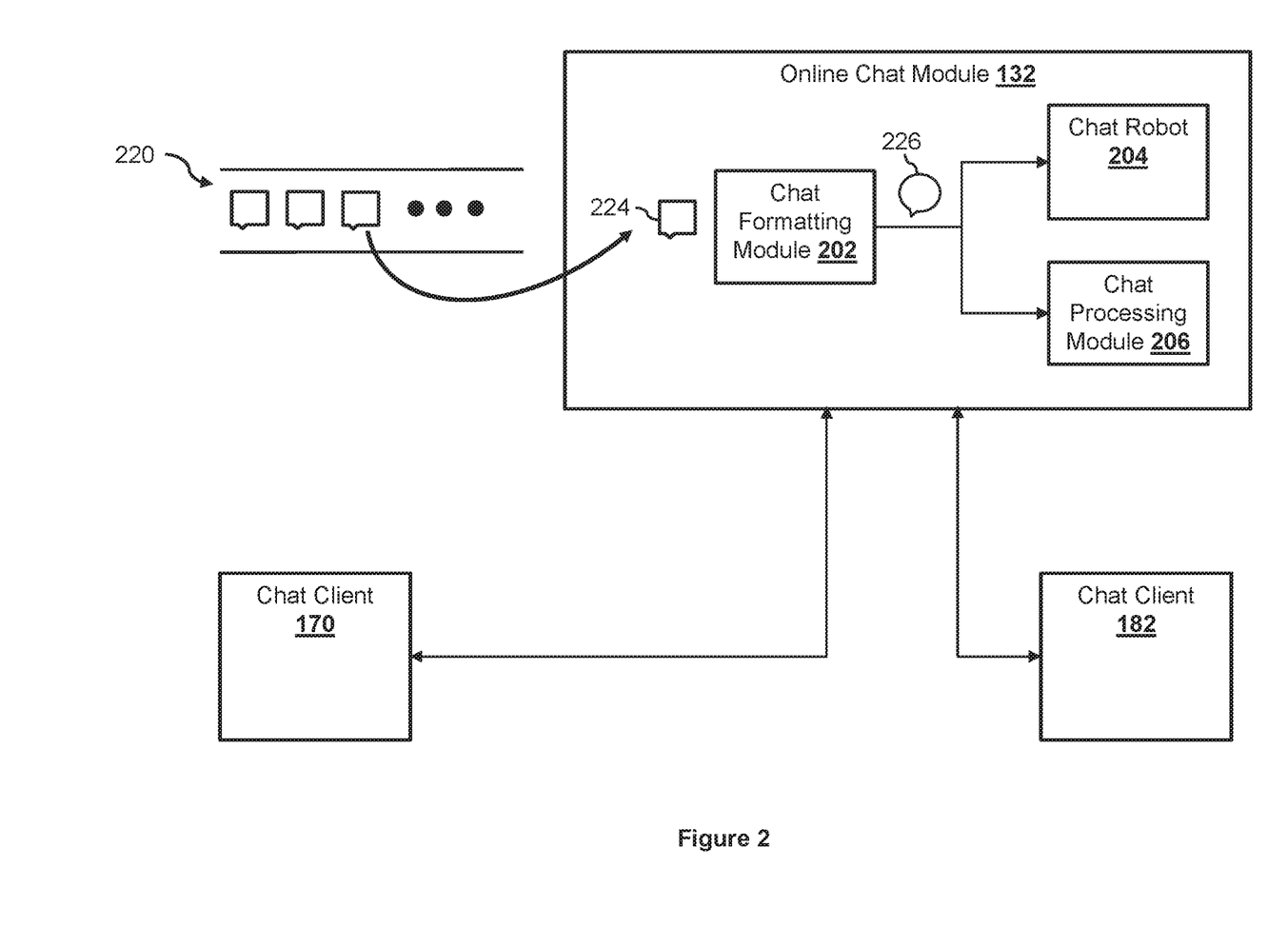
FIG. 2 is a block diagram illustrating an online chat module according to an embodiment of the present disclosure.

FIG. 2 illustrates a block diagram of the online chat module 132 according to an embodiment of the disclosure. The online chat module 132 includes a chat formatting module 202 that implements the chat formatting system as disclosed herein, a chat robot 204, and a chat processing module 206 that may be integrated within the chat robot 204. When the online chat module 132 receives a new chat message (e.g., a chat message that includes informal utterance 224) within a chat session 220 (e.g., from the chat client 170), the online chat module 132 may send a request to the chat formatting module 202 for processing the chat message to generate formatted text 226 before passing the formatted text 226 to the chat robot 204 and/or the chat processing module 206. For example, the chat formatting module 202 may generate formatted texts 226 by normalizing (e.g., translating informal words to pre-defined formal text) and sanitizing (e.g., removing sensitive data) the utterance 224 using the techniques described herein. Thus, the formatted texts 226 may include only well-defined texts and free of sensitive data. The formatted texts 226 may then be provided to the chat robot 204 and/or the chat processing module 206 for further processing. For example, the chat processing module 206 may effectively determine an intent of the user based on the output texts and may cause the chat robot 204 to provide a meaningful dialogue (e.g., request for additional information based on the determined intent) and/or provide relevant services to the user.

Figure 3:
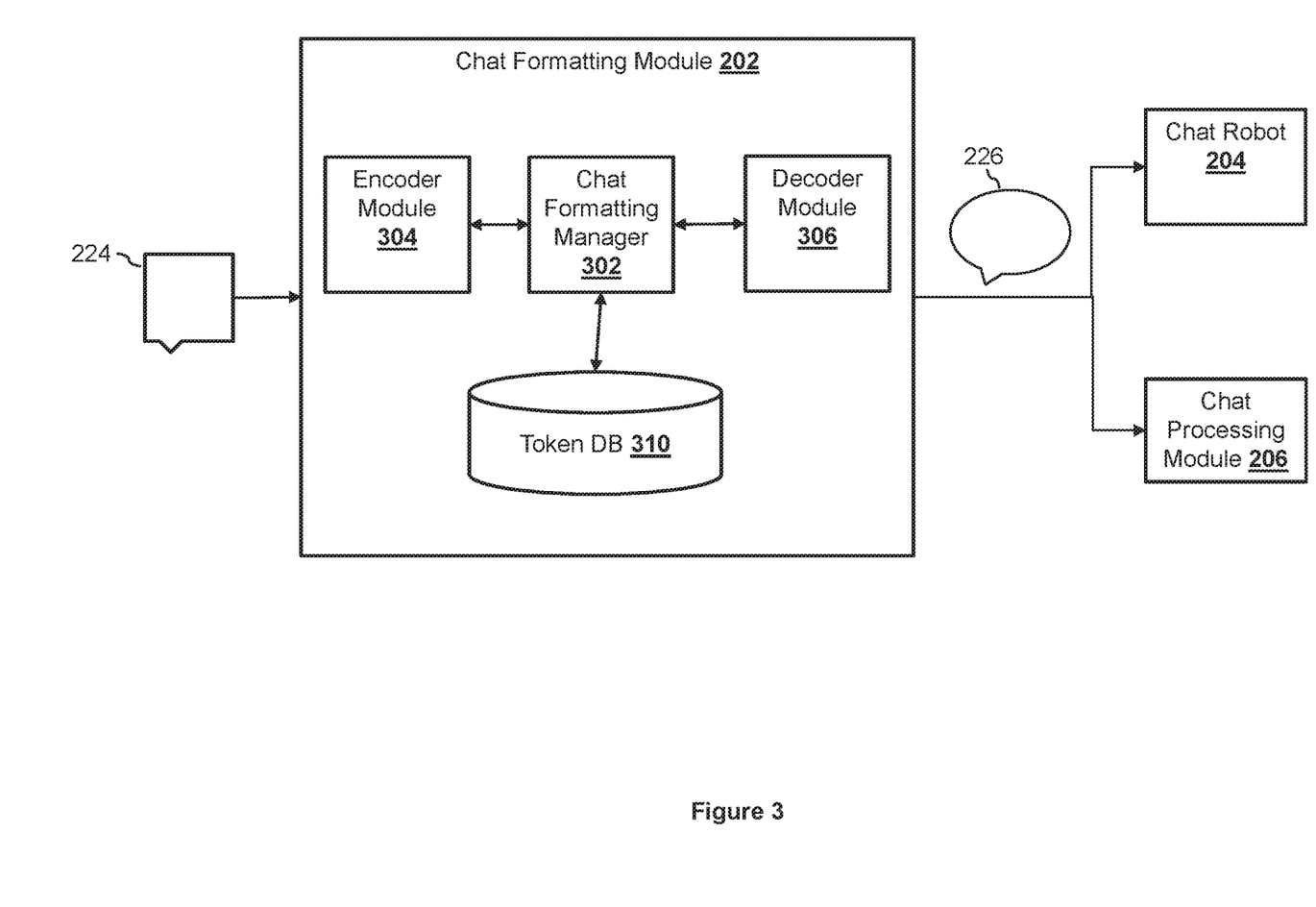
FIG. 3 is a block diagram illustrating a chat formatting module according to an embodiment of the present disclosure.

FIG. 3 illustrates a block diagram of the chat formatting module 202 according to one embodiment of the disclosure. The chat formatting module 202 includes a chat formatting manager 302, an encoder module 304, and a decoder module 306. The chat formatting module 202 may receive a request for formatting a chat message that may include an informal utterance 224. The informal utterance 224 may be obtained from a phone conversation and/or an online chat session between the automated assistance and a user (e.g., the user 140). For example, the informal utterance 224 may include at least a portion of a dialogue generated by the user 140 or at least a portion of a chat message provided by the user 140 during an online chat session 220. The encoder module 304, which may be a bidirectional transformer, may be configured to derive a context associated with the informal utterance 224 by analyzing the informal utterance 224 on a character-by-character basis using techniques disclosed herein. The chat formatting manager 302 may then transmit the informal utterance 224 and the derived context information to the decoder module 306. The decoder module 306, which may be a transformer decoder, may be configured to map each word in the informal utterance 224 to a token from a token database 310 based on the word and the derived context information. As discussed herein, the token database 310 may include vocabulary tokens that correspond to words within a predefined corpus, an unknown token, and a masked token. In some embodiments, the predefined corpus may include only words that are relevant to a particular domain associated with the service provider server 130.

The chat formatting manager 302 may then generate formatted texts 226 based on the mapped tokens. The chat formatting module 202 may provide the formatted texts 226 to the chat robot 204 and/or the chat processing module 206. Since the formatted texts include only formal texts that are relevant to the particular domain associated with the service provider server 130 (free of abbreviations and typographical errors) and exclude any sensitive data, the chat processing module 206 may analyze the formatted texts to determine an intent of the user 140 with higher accuracy and data security. The chat robot 204 may then provide a meaningful dialogue with the user 140 and/or provide services to the user 140 based on the intent. For example, the chat robot 204 may prompt the user 140 for additional information (e.g., an account number, a transaction identifier, etc.). The chat robot 204 may then submit requests to other modules, such as the service application 138, the account database 136 to provide the automated services to the user 140 accordingly.

Figure 4:
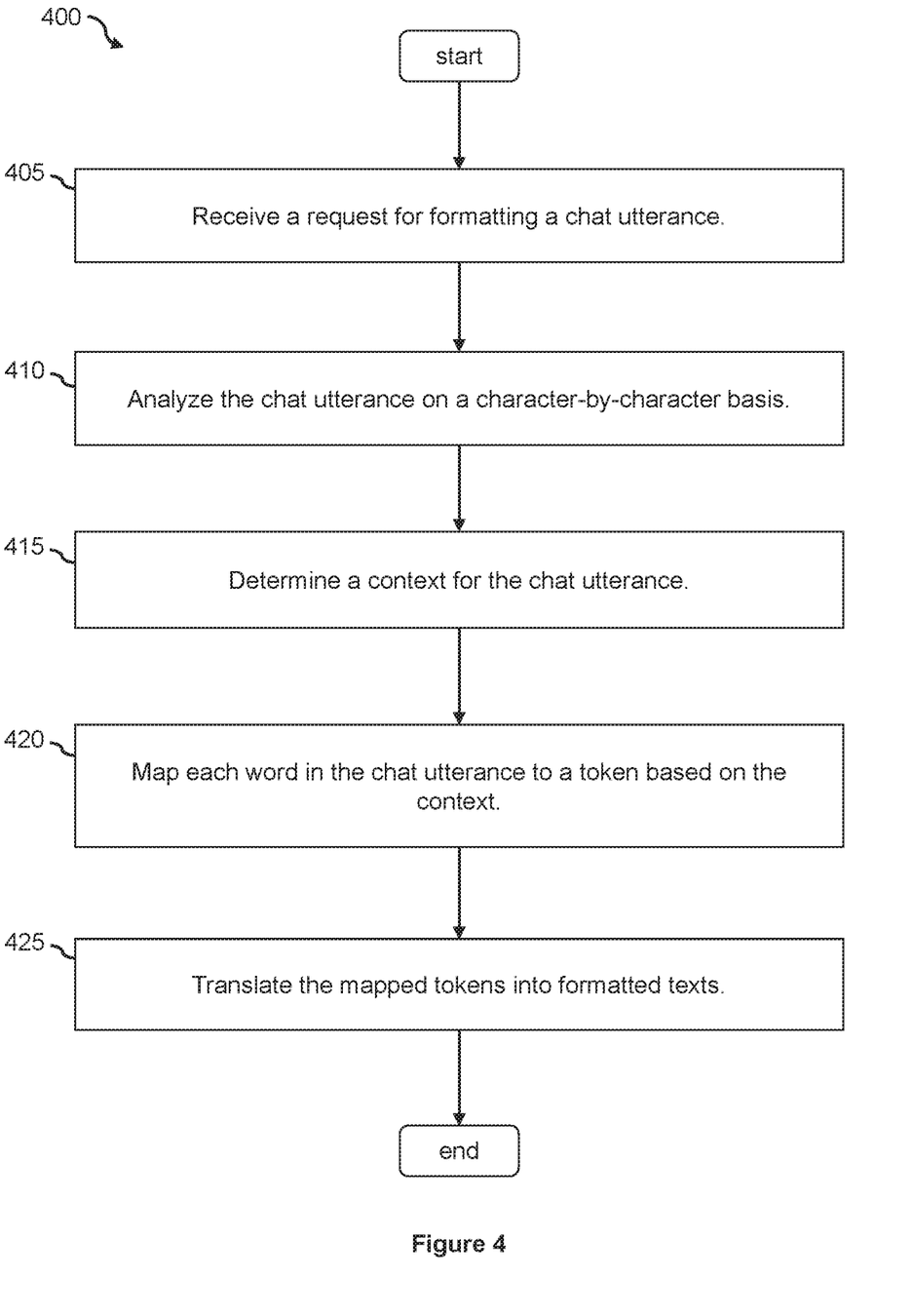
FIG. 4 is a flowchart showing a process of mapping words in an utterance to pre-defined tokens according to an embodiment of the present disclosure.

FIG. 4 illustrates a process 400 for formatting an informal utterance according various embodiments of the disclosure. The process 400 will be described below with reference to FIG. 5, which illustrates an example of formatting and sanitizing the informal utterance 224 using the chat formatting module 202 according to various embodiments of the disclosure. In some embodiments, the process 400 may be performed, at least in part, by the chat formatting module 202. The process 400 begins by receiving (at step 405) a request for formatting a chat utterance. For example, the user 140 may use the chat client 170 of the user device 110 to initiate an online chat session with the service provider server 130. In some embodiments, the service provider server 130 may include an online chat module 132 configured to facilitate a conversation and to provide automated services to users. During the online chat session, the online chat module 132 may receive chat messages, such as the informal utterance 224 from the user 140. In order to facilitate the conversation and to provide automated services to the user 140, the online chat module 132 may use the chat processing module 206 to determine an intent (e.g., filing a dispute, inquiring about a transaction, viewing a balance of an account, etc.) of the user 140 based on the informal utterance 224. However, since the informal utterance 224 may include informal text structure such as abbreviations, words with typographical errors, grammatical errors, etc., it may be difficult for a natural language processor, such as one employed by the chat processing module 206 to accurately analyze the chat message 224. Thus, before passing the informal utterance 224 to the chat processing module 206 for analysis, the online chat module 132 may use the chat formatting module 202 to format the informal utterance in the informal utterance 224. In some embodiments, the chat formatting module 202 may normalize the text in the informal utterance (e.g., translating the informal texts to formal, pre-defined words) and sanitize the text by removing any sensitive data.

The process 400 analyzes (at step 410) the chat utterance on a character-by-character basis and determines (at step 415) a context for the chat utterance. For example, the encoder 304 may analyze characters appearing in the informal utterance 224 to derive context information for the informal utterance 224. As discussed herein, each chat message may be associated with a context, which may correspond to an overall theme of the chat message. The context may be defined by a summation of words and/or characters included within the chat message (and within one or more previous chat messages within the same chat session). The context that is associated with the chat message may influence how each word within the chat message is to be translated by the chat formatting module 202, as a word may have a first meaning under a first context and a second meaning under a second context. The context is especially important for translating informal utterances as words that are abbreviations or having errors can be translated to possibly multiple formal words (or meanings) depending on the context of the utterance. For example, the word "no." may mean the word "no" when the context is an answer to a yes/no question and may mean "number" when the context is regarding to an identifier (e.g., a tracking number, a transaction identifier, etc.). The context may also influence whether a word is determined to include sensitive data. For example, a four-digit number in a chat message may mean the last four digits of a social security number under one context, and may mean a payment amount in another context.

Conventionally, individual words of a chat message are analyzed to determine a context for the chat message. However, due to the unique characteristics of informal utterances, which may include abbreviations, typographical errors, grammatical errors and other informal structure, analyzing the chat message on a word-by-word basis may render an inaccurate result. Instead, according to various embodiments of the disclosure, the encoder module may be configured to determine a context for the informal utterance 224 based on individual characters that appear in the informal utterance 224.

Figure 5:
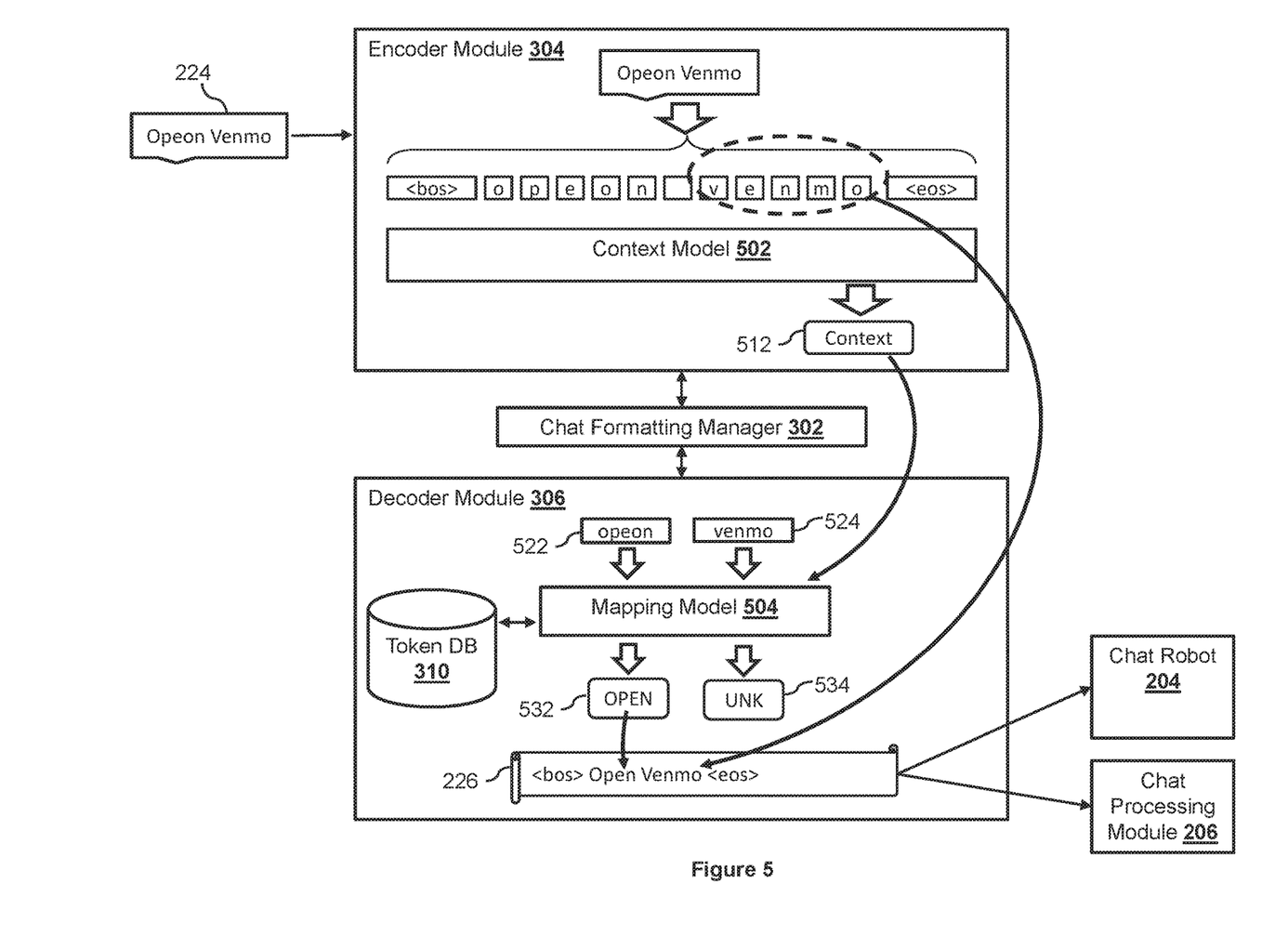
FIG. 5 illustrates translating an informal utterance to formal texts by an encoder and a decoder according to an embodiment of the present disclosure.

As shown in FIG. 5, the encoder module 304 receives the informal utterance 224 that includes an informal utterance "Opeon Venmo." In this example, the informal utterance 224 contains a first word "Opeon" which contains a typographical error and a second word "Venmo" which is a name of a software application. The encoder module 304 may divide the informal utterance 224 into its character components and provide the character components to a context model 502 that is configured to derive context information based on the character components of an informal utterance. When the informal utterance 224 is associated with (related to) one or more other chat messages in the chat flow 220, the encoder module 304 may generate the character information based on the informal utterance 224 as well as the other related chat messages. In some embodiments, the encoder module 304 may also generate character data, such as frequencies of each character (e.g., each letter, numerals, symbols, etc.) appearing in the informal utterance 224, positions of each character, surrounding characters for each position, a length of the utterance, etc., and may provide the character data to the context model 502.

In some embodiments, the chat formatting module 202 may generate a context space having two or more dimensions representing the different contexts that can be associated with different utterances (or chat messages). The chat formatting module 202 may obtain historic utterances (utterances that have been received by the service provider server 130 in the past) that are labeled with context information (e.g., a point within the context space). The context information associated with the historic utterances may be generated by the context model 502 based on character information of the utterances or may be provided by an administrator who manually reviewed and labeled the utterances. In some embodiments, the context may be generated using a clustering algorithm (e.g., k-means). For example, the chat formatting module 202 may determine two or more clusters of utterances based on their positions within the context space. Each of the clusters may correspond to a different context. When the context information associated with the historic utterances are labeled not by the context model 502 (e.g., by the administrator), the chat formatting module 202 may train the context model 502 (which may be a machine learning model) based on the historic utterances and their labeled context information.

In some embodiments, the chat formatting module 202 may configure the context model 502 to accept individual characters appearing in various positions of the chat message 224 as input data. In some embodiments, the context model 502 may either accept or generate character information of an utterance as input data (e.g., frequencies of each character, positions of each character, surrounding characters for each position, etc.). Based on the characters appearing in the informal utterance 224 (and its corresponding character information), the context model 502 may be configured to output context information 512, which may indicate a point or a vector within the context space. While the context information 512 may not describe a specific context that is associated with the informal utterance 224, the chat formatting module 202 may use the position indicated in the context information 512 within the context space to influence the mapping of various words in the utterance 224 to tokens.

Returning to FIG. 4, once a context is determined for the chat utterance, the process 400 maps (at step 420) each word in the chat utterance to a token based on the context and translates (at step 425) the mapped tokens into formatted texts. For example, the decoder module 306 may use the context information 512 to map each word in the chat message 224 to a token from the token database 310, and translate the mapped token to formal texts 226 to be provided for the chat robot 204 and/or the chat processing module 206. As discussed herein, the chat formatting module 202 may generate the tokens based on a corpus of pre-defined words. The corpus of words may include words from a dictionary. However, since the online chat module 132 may be configured to have a limited range of dialogues and provide a limited range of services within a particular domain (e.g., electronic payment, online shopping for a set of products, etc.), the chat formatting module 202 may generate a corpus that includes only words that are relevant to the particular domain. Having a small corpus of formal words is beneficial as the translation generated by the chat formatting system is more precise and consistent.

In some embodiments, the chat formatting module 202 may obtain past chat utterances received from one or more users over a period of time (e.g., last year, last 5 years), and select words for the corpus based on the past chat utterances. In one example, the chat formatting module 202 may select words that appear in the past chat utterances above a frequency threshold. In some embodiments, the chat formatting module 202 may also provide a user interface that enables a user (e.g., an administrator of the automated service) to modify the corpus. By generating the corpus using past chat utterances, the size (the number of words) of the corpus can be significantly smaller than a corpus that includes all possible words (e.g., from a dictionary). A benefit of having a small corpus is that the chat formatting system can ensure that words from the informal utterance can be mapped to words that are relevant to the domain, which may reduce the chance of mis-translation. In some embodiments, the chat formatting module 202 may exclude any words that have no meaning (e.g., names, etc.).

Once the corpus is defined, the chat formatting module 202 may generate tokens. In some embodiments, the chat formatting module 202 may generate a vocabulary token for each word in the corpus. The chat formatting module 202 may also generate an unknown token for words that cannot be mapped to any word in the corpus. The chat formatting module 202 may also generate a masked token representing sensitive data. The chat formatting module 202 may then store the generated tokens in a token database 310.

In some embodiments, as the chat formatting manager 302 parses the chat message 224 initially upon receipt of the utterance 224, the chat formatting manager 302 may generate pointers that point to the start and the end of each word in the chat message 224. The chat formatting manager 302 may identify the starts and ends of different words in the chat message 224 based on one or more pre-defined delimiters (e.g., spaces, punctuations, etc.). In this example, the chat formatting manager 302 may identify a first word 522 "Opeon" and a second word 524 "Venmo" in the chat message 224 based on a space (one of the pre-defined delimiters) separating the words 522 and 524. Each of the words 522 and 524 in the chat message 224 becomes a separate entity to be mapped to a respective token (e.g., a vocabulary token, an unknown token, a masked token, etc.) by the decoder module 306.

In some embodiments, the decoder module 306 may use a mapping model 504 to determine probabilities that the word is associated with the different tokens in the token database 310 (e.g., a probability distribution of the word over the tokens in the token database 310). The probabilities may be determined based on a similarity between the word and the vocabularies in the corpus corresponding to the vocabulary tokens. In some embodiments, the more similarity between the word in the utterance and a vocabulary in the corpus, the higher the probability determined for the corresponding vocabulary token. When the word has very little similarity with anyone of the vocabularies in the corpus, the mapping model 504 may determine that the word corresponds to the unknown token. In some embodiments, the mapping model 504 may also determine whether the word includes sensitive data based on characteristics of the word (e.g., a number of digits, a number of letters, a format and/or arrangement of the digits/letters, etc.). For example, when the majority of the word includes digits, the mapping model 504 may not map the word to any vocabulary token. Instead, the mapping model 504 may determine whether the word includes sensitive data. If the mapping model 504 determines that the word includes sensitive data, the mapping model 504 may map the word to the masked token. On the other hand, if the mapping model 504 determines that the word does not include sensitive data, the mapping model 504 may map the word to the unknown token.

In some embodiments, the mapping model 504 may modify the probabilities (e.g., the probability distribution) based on the context information 512 provided by the encoder module 304. For example, the mapping model 504 may increase the probabilities of one or more tokens and/or reduce the probabilities of one or more other tokens based on the context information 512. For example, when the context information indicates that the utterance 224 is related to a transaction dispute, the vocabulary tokens corresponding to various words such as "dispute", "payment", "pay", "amount" and reduce the probabilities of a masked token (as any digits included in the utterance 244 are likely referring to an amount being disputed instead of a credit card number). On the other hand, when the context information indicates that the utterance 224 is related to a payment transaction, the mapping model 504 may increase the probabilities of a masked token and vocabulary tokens corresponding to words such as "pay" and "account" and may reduce the probabilities of vocabulary tokens corresponding to words such as "dispute", "sell", and "balance". The decoder module 306 may then select a token from the token database 310 for the word (e.g., selecting the token having the highest probability, etc.) based on the probability distribution.

In some embodiments, the mapping model 504 may be a machine learning model that is configured to receive, as inputs, a word, the context information generated by the encoder module 304, and portions of the utterance 224 that has been normalized (e.g., has been translated to output text), and to output the probability distribution over the tokens (after taken into account the context information). In some embodiments, the decoder module 306 may map the words in the utterance 224 to normalized text one word at a time. Thus, the decoder module 306 may first obtain the first word 522 ("opeon") from the utterance 224, and use the mapping model 504 to map the word 522 to a token. In some embodiments, before normalizing any words in the utterance 224, the decoder module 306 may generate a formatted text 226 to include only an indication of the beginning of a sentence (e.g., an indicator "<bos>"). The decoder module 306 may then map the word 522 to a token based on the word 522 ("opeon"), the context information, and the formatted text 226 that has been generated (e.g., including only the indicator "<bos>" at this time). The mapping model 504 may map the word 522 to a vocabulary token 532 corresponding to the word "open" based on the similarity between the word 522 "opeon" and the word "open" and the context information 512. The decoder module 306 may then generate a normalized text "open" and insert the normalized text "open" into the formatted text 226. The formatted text 226 may now include the words "<bos> open".

The decoder module 306 may then obtain the next word (e.g., the second word 524 ("venmo")) from the utterance 224. The decoder module 306 may provide the mapping model 502 as input values the word 524 ("venmo"), the context information, and the formatted text 226 ("<bos> open"). In this example, based on the context information, the formatted text 226, and the fact that the word ("venmo") is not similar to any vocabularies in the corpus, the mapping model 504 may map the word 524 to the unknown token 534. The decoder module 306 may then translate the unknown token 534 to the original word by retrieving the original word 524 (using the pointer that points to the word 524) and insert the original word 524 ("venmo") into the formatted text 226. The formatted text 226 may include the words "<bos> Open Venmo".

If the utterance 224 includes more words, the decoder module 306 may obtain the next word (e.g., a third word) from the utterance 224, and may provide the mapping model 502 the third word, the context information, and the formatted text 226 ("<bos> Open Venmo") to map the third word to a token. However, if there is no more words in the utterance 224, the decoder module 306 may add an indicator for indicating the end of sentence (e.g., "<eos>") to the formatted text 226. The formatted text 226 now includes the words "<bos> Open Venmo <eos>". The decoder module 306 may output the formatted text 226 to a device or another module.

Below are several additional examples of how individual words may be mapped to various tokens by the chat formatting module 202. For example, an utterance "D show jst gettin started" may be mapped to the vocabulary tokens "'The', 'show', 'is', 'just', 'getting', 'started', '.'". An utterance "R u thr?" may be mapped to the vocabulary tokens "'Are', 'you', 'there', '?'". An utterance "I can't enter the tracking number 781243692BSD0433 for a refund" may be mapped to the tokens "'I', 'cannot', 'enter', 'the', tracking', 'number', '<unknown>', 'for', 'a', refund'".

Figure 6:
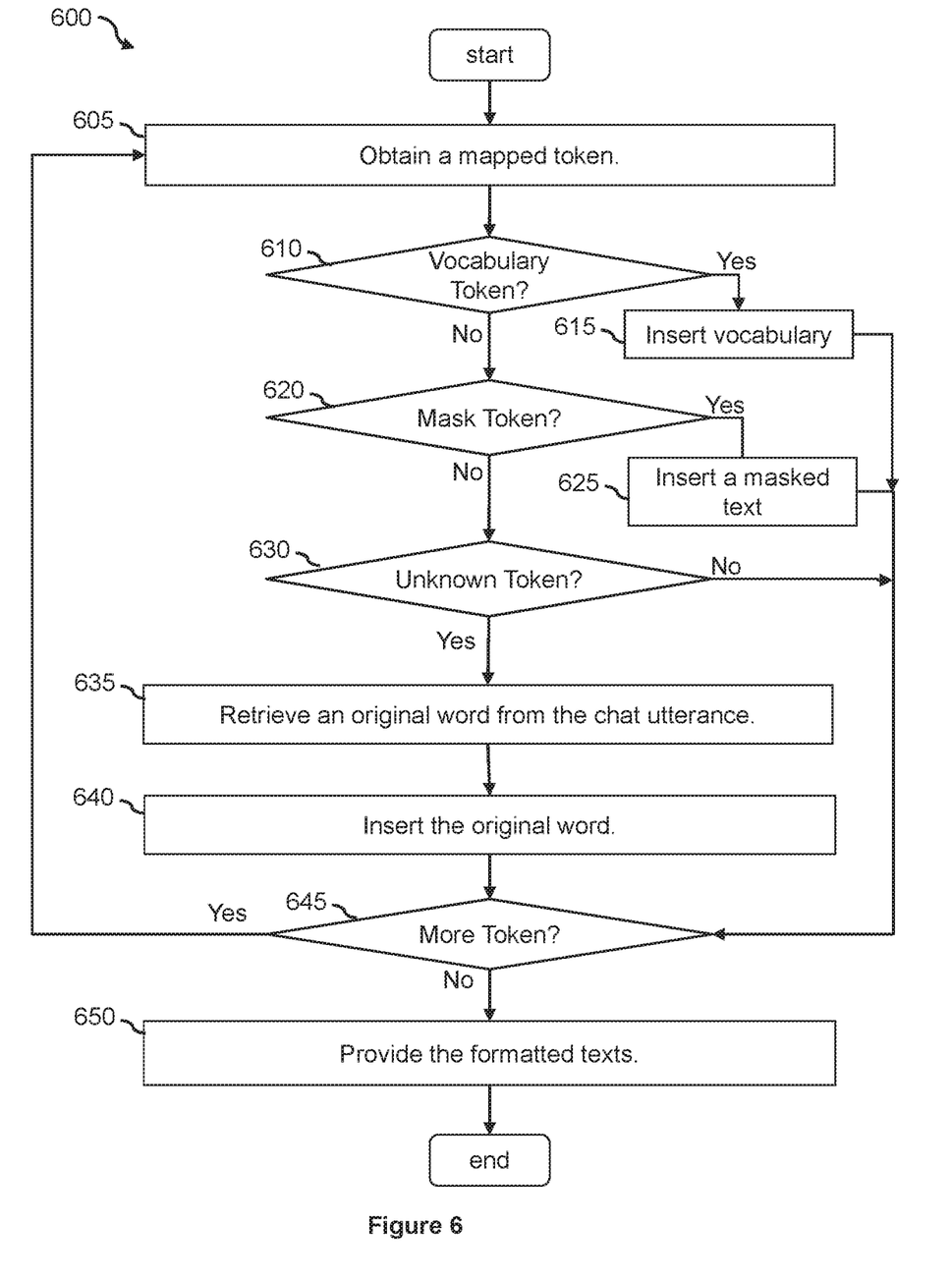
FIG. 6 is a flowchart showing a process of translating mapped tokens to formal texts according to an embodiment of the present disclosure.

FIG. 6 illustrates a process 600 for generating formal texts based on the mapped tokens. In some embodiments, the process 600 may be performed, at least partially, by the chat formatting module 202. The process 600 begins by obtaining (at step 605) a mapped token. For example, the decoder module 306 may obtain the token 532 that was mapped for the word 522 by the mapping model 504. The process 600 then determines (at step 610) whether the token is a vocabulary token. If it is determined that the token is a vocabulary token, the process 600 inserts (at step 615) a vocabulary to the output text (e.g., the formatted text) and determines (at step 645) whether there are more tokens to be translated. For example, the decoder module 306 may determine whether the token 532 is a vocabulary token. Since the token 532 is a vocabulary token that corresponds to the vocabulary "open" that is defined in the corpus, the decoder module 306 may insert the corresponding word "open" into the output 226. The decoder module 306 may then move on to the next token, the unknown token 534.

If it is determined that the token is not a vocabulary token, the process 600 determines (at step 620) whether the token is a masked token. If it is determined that the token is a masked token, the process 600 inserts (at step 625) a masked text into the output text. In some embodiments, the masked text may simply be one or more symbols indicating that the word has been masked or redacted (e.g., "<MASKED>", "<REDACTED>", "**", etc.). In some embodiments, the decoder module 306 may generate the masked text to have the same length (e.g., the same number of characters) as the original word to at least provide an indication of what the masked text represents. For example, when the original word includes a 16-digit credit card number, the masked text may be generated as "   **".

If it is determined that the token is not a masked token, the process 600 determines (at step 630) if the token is an unknown token. If it is determined that the token is an unknown token, the process retrieves (at step 635) an original word from the chat utterance and inserts (at step 640) the original word into the output text. For example, when the decoder module 306 obtains the token 534, the decoder module 306 may determine that the token 534 is an unknown token. The decoder module 306 may then retrieve the original word that was mapped to the token 534 from the utterance 224. In some embodiments, the decoder module 306 may use the starting pointer and the ending pointer associated with the word 524 to retrieve the original word from the utterance 224, and may insert the word 524 "venmo" to the output texts 226.

The process 600 may continue to translate the mapped tokens to formal text by iteratively cycling through steps 605-645 until there is no more tokens left to be translated. The process 600 then provides (at step 650) the formatted texts to other modules or devices. For example, the chat formatting manager 302 may provide the output texts 226 "Open Venmo" to the chat robot 204, the chat processing module 206, and/or the device 180 such that a user 190 may use the chat client 182 to have a dialogue with the user 140.

Thus, the text that is provided to the chat robot 204, the chat processing module 206, and/or the device 180 for processing and analyzing includes only formal, well-defined texts that are free of abbreviations and errors, which improves the performance of the chat robot 204 and/or the chat processing module 206 in analyzing and processing the utterance 224 and providing services to the user 140.

Based on context information derived by analyzing the utterance on a character-by-character basis, the chat formatting module 202 may accurately translate informal utterances into formal texts and remove sensitive data from the utterances. Using an example given above, where a rule-based data categorizer may mistakenly categorize the tracking number in this utterance "I sent the faulty provided the tracking 4536543234980912 USPS" as a credit card number due to its format being similar to one associated with a credit card number. The chat formatting module 202 may derive a context for the utterance as related to a returned item based on the character-by-character analysis of the utterance. The context may assist the chat formatting module 202 to determine that the number "4536543234980912" is more likely a tracking number than a credit card number, and may map the number "4536543234980912" to an unknown token instead of a masked token. The resulting output text will then include the original number "4536543234980912" such that the chat robot 204 and/or the chat processing module 206 may provide the requested assistance for the user.

Using another example given above, where a rule-based data categorizer was not able to recognize that the following utterance "the refund will post to your credit card ending in (8077) in the next 3-5 business days" includes a partial credit card number. By analyzing the utterance in a character-by-character basis, the chat formatting module 202 may derive a context for the utterance that is related to a refund to a credit card account, and may determine that the string "(8077)" has a high likelihood to be a partial credit card number, and thus map the string to a masked token. The output will include the utterance having the partial credit card number redacted, such as "(****)".

Figure 7:
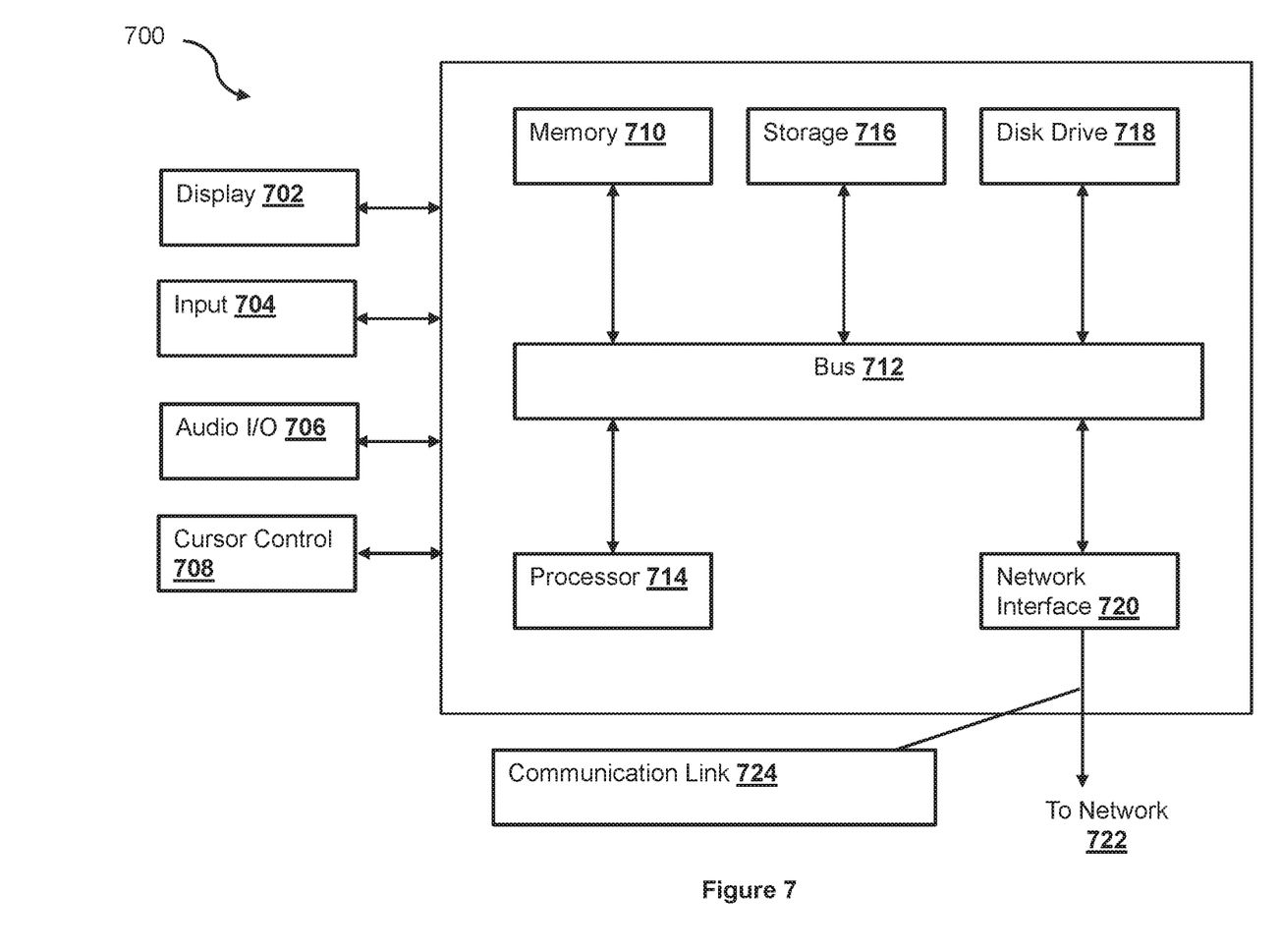
FIG. 7 is a block diagram of a system for implementing a device according to an embodiment of the present disclosure.

FIG. 7 is a block diagram of a computer system 700 suitable for implementing one or more embodiments of the present disclosure, including the service provider server 130, the user device 110, and the device 180. In various implementations, the user device 110 and/or the device 180 may include a mobile cellular phone, personal computer (PC), laptop, wearable computing device, etc. adapted for wireless communication, and the service provider server 130 may include a network computing device, such as a server. Thus, it should be appreciated that the devices 110, 180, and 130 may be implemented as the computer system 700 in a manner as follows.

The computer system 700 includes a bus 712 or other communication mechanism for communicating information data, signals, and information between various components of the computer system 700. The components include an input/output (I/O) component 704 that processes a user (i.e., sender, recipient, service provider) action, such as selecting keys from a keypad/keyboard, selecting one or more buttons or links, etc., and sends a corresponding signal to the bus 712. The I/O component 704 may also include an output component, such as a display 702 and a cursor control 708 (such as a keyboard, keypad, mouse, etc.). The display 702 may be configured to present a login page for logging into a user account, a checkout page for purchasing an item from a merchant, or a chat interface for facilitating an online chat session. An optional audio input/output component 706 may also be included to allow a user to use voice for inputting information by converting audio signals. The audio I/O component 706 may allow the user to hear audio. A transceiver or network interface 720 transmits and receives signals between the computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on the computer system 700 or transmission to other devices via a communication link 724. The processor 714 may also control transmission of information, such as cookies or IP addresses, to other devices.

The components of the computer system 700 also include a system memory component 710 (e.g., RAM), a static storage component 716 (e.g., ROM), and/or a disk drive 718 (e.g., a solid state drive, a hard drive). The computer system 700 performs specific operations by the processor 714 and other components by executing one or more sequences of instructions contained in the system memory component 710. For example, the processor 714 can perform the chat formatting functionalities described herein according to the processes 400 and 600.

Logic may be encoded in a computer readable medium, which may refer to any medium that participates in providing instructions to the processor 714 for execution. Such a medium may take many forms, including but not limited to, non-volatile media, volatile media, and transmission media. In various implementations, non-volatile media includes optical or magnetic disks, volatile media includes dynamic memory, such as the system memory component 710, and transmission media includes coaxial cables, copper wire, and fiber optics, including wires that comprise the bus 712. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 700. In various other embodiments of the present disclosure, a plurality of computer systems 700 coupled by the communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
receiving, from a chat client of a user device via a computer network, a chat utterance comprising a plurality of words;
dividing the chat utterance into a plurality of character components;
determining a distribution of characters across the plurality of words collectively in the chat utterance based on analyzing the plurality of character components;
determining, from a plurality of contexts, a particular context associated with the chat utterance based on the distribution of characters across the plurality of words collectively in the chat utterance;
mapping the plurality of words of the chat utterance to a plurality of respective tokens from a group of tokens based on the particular context determined for the chat utterance, wherein each word in the plurality of words is mapped to a respective token from the group of tokens further based on one or more characters within the word, wherein the group of tokens comprises at least a plurality of vocabulary tokens, and wherein each vocabulary token of the plurality of vocabulary tokens corresponds to a respective vocabulary in a dictionary;
generating a formatted chat utterance based on the plurality of tokens;
determining electronic data based on the formatted chat utterance; and
transmitting, to the chat client of the user device via the computer network, the electronic data as an automated response to the chat utterance.

2. The system of claim 1, wherein the mapping the plurality of words in the chat utterance to the plurality of respective tokens comprises:
determining a respective probability that a first word in the chat utterance is associated with each of a plurality of vocabularies in the dictionary;
modifying at least one of the respective probabilities based on the particular context determined for the chat utterance; and
selecting, from the plurality of vocabularies, a particular vocabulary for the first word based on the modified respective probabilities of the plurality of vocabularies.

3. The system of claim 2, wherein a first respective probability that the first word is associated with a first vocabulary of the plurality of vocabularies is determined based on a similarity between the first word and the first vocabulary.

4. The system of claim 2, wherein a first respective probability that the first word is associated with a first vocabulary of the plurality of vocabularies is determined based on a predefined rule associated with the first word.

5. The system of claim 1, wherein the group of tokens further comprises a masked token, and wherein the mapping the plurality of words in the chat utterance to the plurality of respective tokens comprises:
analyzing a first word in the chat utterance based on the particular context determined for the chat utterance and a format of the first word;
determining that the first word comprises data associated with a particular data type based on the analyzing; and
in response to determining that the first word comprises the data associated with the particular data type, mapping the first word to the masked token.

6. The system of claim 1, wherein the group of tokens further comprises a masked token and an unknown token, and wherein the mapping the plurality of words in the chat utterance to the plurality of respective tokens comprises:
determining that a first word in the chat utterance is not associated with any vocabulary in the dictionary;
in response to determining that the first word is not associated with any vocabulary in the dictionary, determining whether the first word comprises data associated with a particular data type based at least in part on the particular context determined for the chat utterance and a format of the first word; and
mapping the first word to the masked token if the first word comprises the data associated with the particular data type, or mapping the first word to the unknown token if the first word does not comprise the data associated with the particular data type.

7. The system of claim 1, wherein the generating the formatted chat utterance comprises translating each of the plurality of respective tokens to a formatted word corresponding to a vocabulary in the dictionary.

8. A method, comprising:
receiving, by one or more hardware processors, an utterance comprising a plurality of words from a chat client of a user device via a computer network;
determining, by the one or more hardware processors, a distribution of characters across the plurality of words collectively in the utterance;
determining, by the one or more hardware processors, context information associated with the utterance based on the distribution of characters across the plurality of words collectively in the utterance;
mapping, by the one or more hardware processors, each word of the plurality of words in the utterance to a respective token selected from a group of tokens based on the context information associated with the utterance and one or more characters within the word, wherein the group of tokens comprises at least a plurality of vocabulary tokens, wherein each vocabulary token of the plurality of vocabulary tokens corresponds to a respective vocabulary;

generating, by the one or more hardware processors, formatted texts based on the mapping;

determining, by the one or more hardware processors, electronic data based on the formatted texts; and transmitting, by the one or more hardware processors to the chat client of the user device via the computer network, the electronic data as a response to the utterance.

9. The method of claim 8, wherein the distribution of characters across the plurality of words in the utterance comprises at least one of a frequency of a particular character in the plurality of words, one or more positions of the particular character in the plurality of words, one or more relative positions of the particular character with respect to other characters in the plurality of words, or a character count of the plurality of words.

10. The method of claim 8, wherein the determining the distribution of characters across the plurality of words collectively in the utterance comprises identifying different characters that appear in different words in the plurality of words.

11. The method of claim 8, further comprising:
defining a context space associated with a plurality of contexts, wherein the context information indicates a position within the context space.

12. The method of claim 8, wherein the utterance is provided by a user during an online chat session, and wherein the method further comprises:
determining an intent of the user by analyzing the formatted texts, wherein the electronic data is determined further based on the intent.

13. The method of claim 8, wherein the mapping each word of the plurality of words in the utterance to the respective token comprises:
generating a probability distribution of a first word in the utterance over the plurality of vocabulary tokens based on similarities between one or more characters in the first word and the vocabularies corresponding to the plurality of vocabulary tokens.

14. The method of claim 13, further comprising modifying the probability distribution based on the context information.

15. A non-transitory machine-readable medium having stored thereon machine-readable instructions executable to cause a machine to perform operations comprising:
receiving, from a chat client of a user device via a computer network, a chat utterance comprising a plurality of words;
determining character attributes within the chat utterance, wherein the character attributes represent a distribution of characters across the plurality of words collectively within the chat utterance;
determining context information for the chat utterance based on the character attributes;
mapping, based on the context information determined for the chat utterance, the plurality of words in the chat utterance to a plurality of respective tokens from a group of tokens comprising at least a plurality of vocabulary tokens, wherein each word in the plurality of words is mapped to a respective token from the group of tokens further based on one or more characters within the word, wherein each vocabulary token of the plurality of vocabulary tokens corresponds to a respective vocabulary in a dictionary;
generating a formatted chat utterance based on the plurality of tokens;
generating an electronic communication based on the formatted chat utterance; and
transmitting, to the chat client of the user device via the computer network, the electronic communication as a response to the chat utterance.

16. The non-transitory machine-readable medium of claim 15, wherein the mapping the plurality of words in the chat utterance to the plurality of respective tokens comprises:
determining a probability distribution of a first word in the chat utterance over a plurality of vocabularies;
modifying the probability distribution based on the context information determined for the chat utterance; and
selecting, from the plurality of vocabularies, a particular vocabulary for the first word based on the modified probability distribution.

17. The non-transitory machine-readable medium of claim 16, wherein the modifying the probability distribution comprises increasing a first probability associated with a first vocabulary based on the context information.

18. The non-transitory machine-readable medium of claim 16, wherein the modifying the probability distribution comprises decreasing a second probability associated with a second vocabulary based on the context information.

19. The non-transitory machine-readable medium of claim 15, wherein the group of tokens further comprises a masked token, and wherein the mapping the plurality of words in the chat utterance to the plurality of respective tokens comprises:
analyzing a first word in the chat utterance based on the particular context;
determining that the first word comprises data associated with a particular data type based on the analyzing; and
in response to determining that the first word comprises data associated with the particular data type, mapping the first word to the masked token.

20. The non-transitory machine-readable medium of claim 15, wherein the group of tokens further comprises a masked token and an unknown token, and wherein the mapping the plurality of words in the chat utterance to the plurality of respective tokens comprises:
determining that a first word in the chat utterance is not associated with any vocabulary in the dictionary;
in response to determining that the first word is not associated with any vocabulary in the dictionary, determining whether the first word comprises data associated with a particular data type based on the context information determined for the chat utterance and one or more characters in the first word; and
mapping the first word to the masked token if the first word comprises the data associated with the particular data type, or mapping the first word to the unknown token if the first word does not comprise the data associated with the particular data type.

* * * * *